Figure 1:
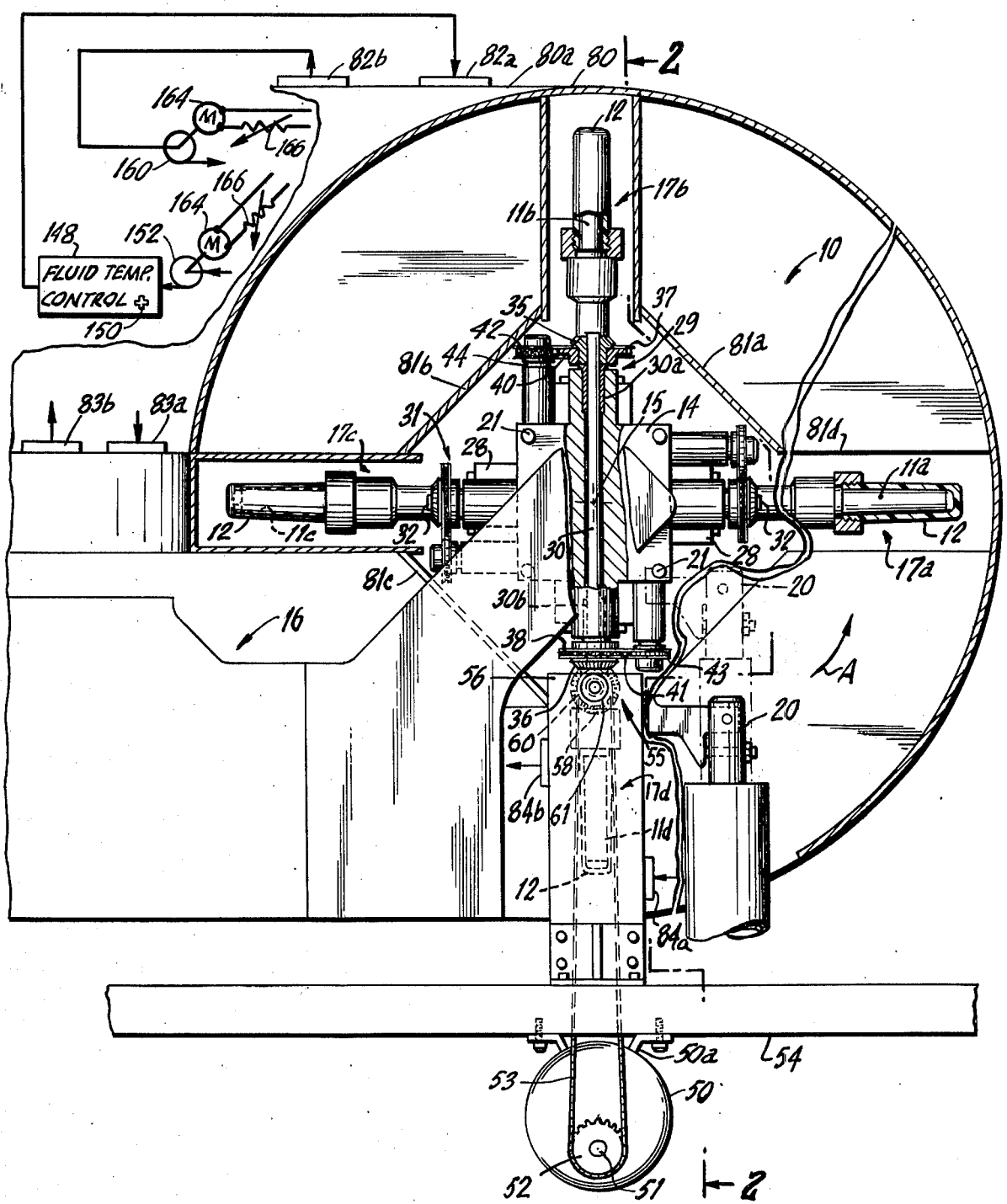

United States Patent [19]

Farrell

[11] 4,040,203
[45] Aug. 9, 1977

[54] ROTATING CORE RODS

[75] Inventor: John Jerome Farrell, Greenbrook, N.J.

[73] Assignee: Consupak, Inc., Morristown, N.J.

[21] Appl. No.: 684,668

[22] Filed: May 10, 1976

[51] Int. Cl.² ............................................. F27B 9/14
[52] U.S. Cl. .................................. 432/124; 432/128; 432/163; 34/105; 198/378
[58] Field of Search ............... 432/121, 124, 128, 129, 432/133, 122, 162–164; 34/105, 236; 198/339, 342, 378, 373; 425/DIG. 208, DIG. 213

[56] References Cited

U.S. PATENT DOCUMENTS

| 3,840,999 | 10/1974 | Whelan | 34/105 |
| 3,883,295 | 5/1975 | Lowderman et al. | 432/124 |
| 3,930,788 | 1/1976 | Daane et al. | 432/124 |
| 3,935,647 | 2/1976 | Aschberger | 432/122 |

Primary Examiner—John J. Camby
Assistant Examiner—Henry C. Yuen
Attorney, Agent, or Firm—Marvin Feldman; Stephen E. Feldman

[57] ABSTRACT

A plurality of core rods with parisons thereon are mounted to an indexing head with the core rods disposed in a temperature conditioning chamber and wherein the core rods are simultaneously rotated to effect temperature distribution throughout the parisons. Pluralities of core rods are angularly disposed and simultaneously rotated. The apparatus is particularly useful in orientation injection blow molding, wherein the parison is a relatively thick cross section or wherein the parison thermoplastic has a low thermal conductivity.

10 Claims, 2 Drawing Figures

ROTATING CORE RODS

This invention relates to temperature conditioning a plurality of parisons. Specifically, this invention relates to rotating a plurality of core rods with parisons thereon in a temperature conditioned chamber to effect even temperature distribution throughout the parisons.

In Seefluth, U.S. Pat. No. 3,594,862, issued July 27, 1971 and Seefluth, U.S. Pat. No. 3,761,550 issued Sept. 25, 1973, there is disclosed an apparatus wherein a single parison is disposed within a sleeve and the parison rotated about an internally disposed radiant heating means to provide even heating of the parison.

Such prior art devices required the separate handling and conditioning of each parison, and further required the parison to be removed from the machine on which it was formed and placed in such devices for heating and then subsequent mounted on a blow molding apparatus.

Now there is provided by the present invention, an apparatus which permits simultaneous rotation of a plurality of parisons mounted on their respective core rods to effect even temperature distribution with the core rods positioned in a temperature conditioning chamber.

It is therefore an object of this invention to provide an apparatus for rotating a plurality of core rods having parisons thereon in a temperature conditioning chamber to effect even temperature distribution through each parison.

It is another object of this invention to provide an apparatus as aforesaid wherein at least two pluralities of core rods are simultaneously rotated in different temperature conditioning chambers.

It is another object of this invention to provide an apparatus for rotating a plurality of core rods mounted to an indexing head wherein the core rods are rotated when the head is indexed.

It is still a further object of this invention to provide an apparatus as immediately aforesaid wherein there is one plurality of core rods undergoing rotating in a temperature conditioning chamber whereas another plurality of core rods mounted to the indexing head is positioned in and indexed in a molding operation station and is not undergoing rotation.

Figure 2:
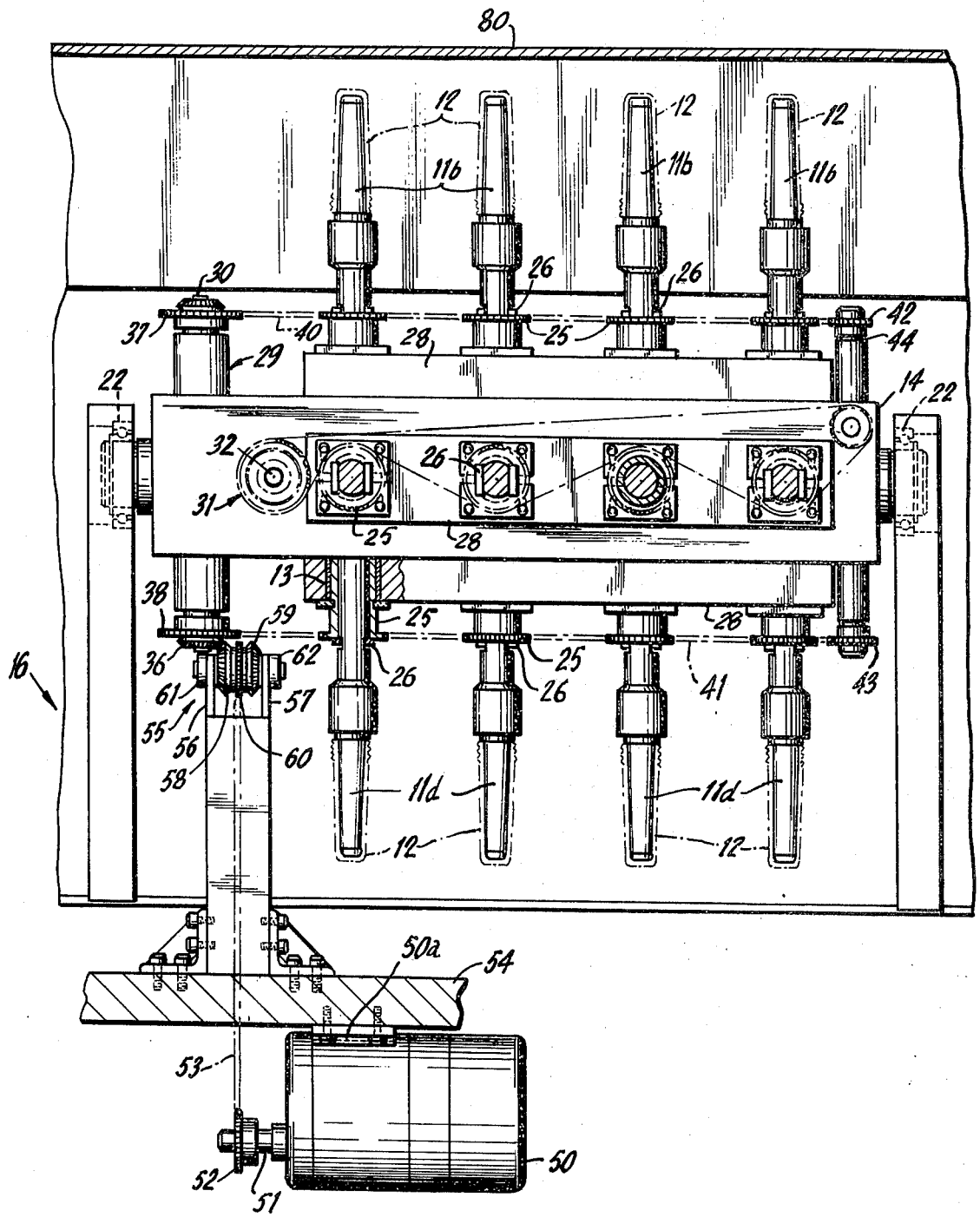

The aforesaid as well as other objects and advantages of the invention will become apparent from the following description taken in conjunction with the accompanying drawings in which:

FIG. 1 is a partial sectional elevational view of the apparatus of the invention with three pluralities of core rods in the temperature conditioning chambers, at an operation station, and a fourth plurality of core rods being depicted at the changeover station; and FIG. 2 is a sectional view taken along line 2—2 of FIG. 1.

Referring to FIGS. 1 and 2, the apparatus of the invention is generally designated as 10.

Core rods 11a-11d having injection molded parisons 12 thereon are rotatably mounted in bushings 13 to each side of square block 14. Block 14 in turn is vertically rotatably mounted about its horizontally disposed axis 15, to indexing head 16 which is horizontally rotatable. Head 16 is mounted to a spline shaft (not shown) and is rotatably indexed at a plurality of injection blow molding stations, in the well known manner.

In indexing, one plurality of core rods 11a is horizontally outwardly disposed, whereas each of the other pluralities of core rods namely 11b, 11c and 11d are disposed in temperature conditioning chambers 17b, 17c and 17d, respectively. The core rods at a horizontally outwardly disposed station may be undergoing one of several operations such as injection molding, blow molding or stripping (not shown) all in the well known manner. The core rods in chambers 17b, 17c and 17d undergo temperature conditioning to effect even temperature distribution of the parisons prior to blow molding so that the parisons are assuredly at the desired blow molding temperature. This is particularly so in orientation blow molding wherein the parisons must be conditioned within the molecular orientation temperature range.

In indexing, the core rods are cycled at the changeover station 17a, as block 14 being supportably rotatably mounted on bearings 22, undergoes rotation by the action of apparatus 20 engaging block pin 21 (typical), and with an upward vertical drive of 20 effects this rotation. However this core rod cycling apparatus at the changeover station is the subject matter of another, copending application. With each successive horizontal rotation of the head 16 and the successive changeover, each core rod moves successively from a 17a position to 17b to 17c to 17d and back to 17a position with the parison fully temperature conditioned for blow molding, as shown in copending commonly-owned application, U.S. Ser. No. 635,898, filed Nov. 28, 1975 now U.S. Pat. No. 3,985,485, granted Oct. 17, 1976.

In indexing, the pluralities of core rods 11a and 11b of stations 17b and 17d undergo simultaneous rotation whereas the pluralities of core rods 17a and 17c do not rotate, as will be more fully explained hereinafter.

Each core rod 11a-11d is mounted within a sprocket 25, and is affixedly held to core rod by mounting members 26, so that the sprocket 25 and core rod will rotate together in bushing 13. Members 26 reside in recess 27 of each core rod. The bushing 13 is mounted in bushing 28 which in turn is mounted to block 14.

A first gear assembly 29 is mounted through block 14 so that shaft 30 is parallel to the axes of core rods 11b and 11d, and a second gear assembly 31 is mounted through block 14 so that its shaft 32 is parallel to the axes of core rods 11a and 11c. The axes of shafts 30 and 32 are perpendicularly disposed and in accurate spaced relationship for purposes hereinafter appearing.

Gear assembly 29, comprises shaft 30 mounted in bushings 30a and 30b and bevel gears 35 and 36, are mounted on the opposite ends of shaft 30. Sprockets 37 and 38 are concentrically mounted and fixedly held to respective bevel gears 35 and 36. Sprockets 37 and 38 engage chains 40 and 41 respectively which chains engage the sprockets of core rods 11b and 11d, respectively in an over and under manner so that adjacent core rods rotate simultaneously but in opposite directions. Support sprockets 42 and 43 are rotatably mounted on shaft 44 which transverses block 14 so that shafts 44 and 30 are in parallel disposition. Chain 40 engages sprocket 42 whereas chain 41 engages sprocket 43. Gear assembly 31 is similar in construction to gear assembly 29.

A drive motor 50 is mounted by flange 50a to frame 54. Said motor 50 is provided with shaft 51, and drive sprocket 52 mounted thereon. An endless chain 53 engages drive sprocket 52 and also engages sprocket 60. Sprocket 60 is part of gear assembly 55 which is supportably mounted by flange portions 56 and 57, which flange portions are in turn mounted to frame 54. Gear assembly 55 comprises a double bevel gear 58 and 59 disposed on opposite sides of sprocket 60 and bevel gears 58, 59 as well as sprocket 60 are mounted in bearings 61 and 62 of flange portion 56 and 57, respectively. In this manner of construction motor 50 drives shaft 51 and sprocket 52 to in turn drive chain 53 which in turn causes rotation of sprocket 60 and bevel gears 58 and 59.

As depicted in FIGS. 1 and 2, bevel gear 58 enmeshes with bevel gear 36 so as to cause rotation of shaft 30. With the rotation of shaft 30, sprocket 37 is rotated driving chain 40, sprocket 42, and rotating core rods 11b simultaneously with core rods 11d.

Bevel gear 36 engages bevel gear 58 when the core rods are indexed, and in the next indexing cycle with block rotation then at the changeover station 17a, as depicted by arrow A, bevel gear 70 of shaft 32 will engage bevel gear 59 so that core rods 11a and 11c will then undergo rotations in a manner similar to that of core rods 11b and 11d heretofore described. Of course the distances between bevel gears 58 and 59, and shafts 30 and 32, are accurately provided for, to effect this alternate drive from the single drive source 50.

It is to be borne in mind that as depicted in FIG. 1, the vertically disposed core rods 11b and 11d undergo rotation in temperature conditioning chambers 17b and 17d, respectively, whereas core rods 11a and 11c are not rotated. Particularly core rods 11a may be undergoing an injection blow molding operation (not shown) as aforesaid, and therefore must be non-rotating.

Temperature conditioning chambers 17b, 17c and 17d are housed within plenum 80 which extends around the entire periphery of the turntable. Internal members 81a, 81b, 81c and 81d provide support for the chamber construction. Each chamber 17b, 17c and 17d is provided with inlet and outlet ports 82a, 82b, 83a, 83b; and 84a, 84b. Referring specifically to 82a and 82b, although similar construction is provided for the other temperature conditioning chambers, inlet port 82a opens through the top wall 80a of plenum 80. Fluid for temperature control is supplied to port 82a from fluid temperature control means 148 which has a temperature control adjustment 150, and a blower 152 for forcing air through the fluid temperature control means 148 and through inlet port 82a. Separate fluid temperature means can be provided for each inlet port, so that the temperature can be different in different chambers and at different locations around the plenum.

Temperature controlling fluid exhausts from the chamber 17b through outlet port 82a. The outlet port 82a is shown connected with an exhaust blower 160. The blowers 152 and 150 are preferably drive by motors 164 having speed controllers 166 for regulating the rate of flow of the temperature control fluid to and from the chambers.

It is also to be borne in mind that a drive assembly comprising basically, the drive motor assembly, drive chain, and double bevel gear assembly, may be provided at each indexing station around the periphery of the indexing head, so that there is some rotation of the vertically disposed core rods at each station, except of course the changeover station.

While there is described and illustrated a specific embodiment of the invention, it will be clear that variations in detail of the specific embodiment specifically illustrated and described may be resorted to without departing from the spirit and scope of the invention as defined in the appended claims.

What is claimed is:

1. An apparatus for parison temperature distribution comprising, an indexing head being horizontally rotatable, a block mounted to said indexing head so as to be rotatable about an axis transverse to the axis of rotation of the head, a first plurality of cores rotatably mounted to said block, and a second plurality of core rods being rotatably mounted to said block, said pluralities of core rods being angularly disposed to each other, each of said core rods having a surface to support a parison, a chamber with temperature control means for conditioning parisons, with said pluralities extending into said chamber, and means to rotate said pluralities of core rods in the chamber.

2. The apparatus of claim 1, said means to rotate comprising, drive means, and first gear means connected to said drive means, second gear means operably connected to said first plurality of core rods, and third gear means operably connected to said second plurality of core rods, and in said first position said first and second gear means are connected, and said second position said first and third gear means are connected.

3. The apparatus of claim 2, wherein said each of said gear means comprises a bevel gear, and in said first position the second bevel gear enmeshes with one portion of the first bevel gear and in said second position the third bevel gear meshes with another portion of the first bevel gear.

4. An apparatus for parison temperature distribution comprising, an indexing head being horizontally rotatable, a block mounted to said indexing head so as to be rotatable about an axis transverse to the axis of rotation of the head, a first plurality of cores rotatably mounted to said block, and a second plurality of core rods being rotatably mounted to said block, said pluralities of core rods being angularly disposed to each other, each of said core rods having a surface to support a parison, a chamber with temperature control means for conditioning parisons, with said first plurality of core rods extending into said chamber, and said second plurality of core rods being disposed outside said chamber, and means to rotate said first plurality of core rods in the chamber.

5. The apparatus of claim 4, wherein the means to rotate the core rods is connected to each of the core rods of said first plurality so as to rotate all the core rods at the same time.

6. The apparatus of claim 4, said means to rotate the core rods comprising, drive means, first gear means connected to said drive means, and second gear means connected to said indexing head and operably connected to said first plurality of core rods, and in indexing, said first and second gear means are connected so that the drive means actuates the rotation of the core rods.

7. The apparatus of claim 6, said first gear means comprising a first bevel gear and said second gear means comprising a second bevel gear and wherein said bevel gears are enmeshed with the core rods indexed.

8. The apparatus of claim 4, wherein said means to rotate the core rods comprises drive means, gear means connected to the drive means, a sprocket on each core rod ad a chain engaging each sprocket and said gear means, whereby the drive means drives said gear means to in turn drive said sprocket so as to rotate said core rods.

9. The apparatus of claim 4, wherein said pluralities of core rods are disposed 90°.

10. The apparatus of claim 4, wherein said pluralities of core rods are disposed 180°.

* * * * *